(12) United States Patent
Sugimoto (10) Patent No.: US 12,240,531 B2
(45) Date of Patent: Mar. 4, 2025

(54) STEERING DEVICE

(71) Applicant: Hitachi Astemo, Ltd., Hitachinaka (JP)

(72) Inventor: Kenta Sugimoto, Hitachinaka (JP)

(73) Assignee: HITACHI ASTEMO, LTD., Hitachinaka (JP)

(*) Notice: Subject to any disclaimer, the term of this patent is extended or adjusted under 35 U.S.C. 154(b) by 0 days.

(21) Appl. No.: 18/546,650

(22) PCT Filed: Mar. 25, 2021

(86) PCT No.: PCT/JP2021/012456
§ 371 (c)(1),
(2) Date: Aug. 16, 2023

(87) PCT Pub. No.: WO2022/201407
PCT Pub. Date: Sep. 29, 2022

(65) Prior Publication Data

US 2024/0132139 A1    Apr. 25, 2024
US 2024/0227912 A9    Jul. 11, 2024

(51) Int. Cl.
*B62D 3/12* (2006.01)

(52) U.S. Cl.
CPC .................................... *B62D 3/12* (2013.01)

(58) Field of Classification Search
CPC ....................................................... B62D 3/12
See application file for complete search history.

(56) References Cited

U.S. PATENT DOCUMENTS 7,959,167 B2 * 6/2011 Kojima ................... B62D 3/12
74/606 R
2016/0311461 A1 * 10/2016 Hardesty ............. B62D 21/152

FOREIGN PATENT DOCUMENTS

JP    2008-238979 A     10/2008
JP    2014189108 A *    10/2014

OTHER PUBLICATIONS

JP-2014189108-A Machine English translation (Year: 2014).*
International Search Report, International Application No. PCT/JP2021/012456, Date of Mailing: May 25, 2021, 3 pages.

* cited by examiner

*Primary Examiner* — Jason D Shanske
*Assistant Examiner* — Matthew James O'Neill
(74) *Attorney, Agent, or Firm* — Rankin, Hill & Clark LLP (57) ABSTRACT

A steering device has a rib formed on a housing. The rib includes a first rib and a second rib intersecting with the first rib. When, in the two ends of the first rib, an end close to an intersection portion is defined as one end, the first rib includes a brittle portion which has reduced strength in comparison with those of the other portions and which is provided between the intersection portion and the one end.

20 Claims, 7 Drawing Sheets

STEERING DEVICE

TECHNICAL FIELD

The present disclosure relates to a steering device for vehicles, etc.

BACKGROUND ART

A vehicle is provided with, for example, a steering device to turn running wheels. Patent Document 1 discloses a conventional technology.

A steering device disclosed in Patent Document 1 includes a pinion shaft provided with a pinion, a rack shaft which is provided with a rack meshed with the pinion, and which is movable in the vehicle widthwise direction, and a housing that stores therein the pinion and the rack.

When a driver turns a steering wheel, the pinion shaft rotates, and the rack shaft is displaced in the horizontal direction through the pinion and the rack. The displacement of the rack shaft causes the running wheels to be turned, and thus a vehicle is caused to run in a predetermined direction.

CITATION LIST

Patent Literatures

Patent Document 1: JP 2008-238979 A

SUMMARY OF INVENTION

Technical Problem

Meanwhile, a vehicle may collide with, while running, the other vehicle or an installed object installed on a road. In such a case, in order to protect a person in the vehicle from collision shock, it may be necessary to break the housing of the steering device.

For example, the housing of the steering device is attached to a sub-frame. The sub-frame forms a part of a vehicular body, and supports an engine, a transmission, etc. At the time of the collision of the vehicle, in order to suppress heavy components, such as the engine and the transmission, to enter the interior of the vehicle, the sub-frame that is supporting the engine, the transmission, etc., may be caused to fall out. At this time, by breaking the housing of the steering device, the sub-frame is further surely caused to fall out, and thus the engine, the transmission, etc., are suppressed to enter the interior of the vehicle. This enhances the protection capability of a person in the vehicle.

Not only the case in which the housing of the steering device is attached to sub-frame, but also it is desirable to surely break the housing when predetermined load is input.

An objective of the present disclosure is to provide a steering device that can surely break a housing when predetermined load is input.

Solution to Problem

The inventor of the present disclosure accomplishes, upon keen research and development activities, a technical knowledge such that a housing can further surely break when predetermined load is input by providing at least two ribs, by forming a first rib on the outer circumferential surface of the housing, and a second rib that intersects with the first rib, and by forming at least one brittle portion that has reduced strength in comparison with those of the other portions between one end that is close to an intersection portion in the two ends of the first rib and the intersection portion. The present disclosure is accomplished based on such a knowledge.

The present disclosure will be described below.

According to a first example embodiment of the present disclosure, there is provided a steering device that includes:

a pinion shaft which is a bar-shape member provided so as to be rotatable, and which has a pinion formed partially;

a rack shaft which has a rack formed so as to be meshed with the pinion, and which is movable in a vehicle widthwise direction; and a housing that stores therein at least the pinion and the rack, in which at least two reinforcement ribs that are a first rib and a second rib intersecting with the first rib are formed on an outer circumferential surface of the housing, and in which when a portion where the first rib and the second rib intersect with each other is defined as an intersection portion, and in two ends of the first rib, an end close to the intersection portion is defined as the one end, the first rib comprises a brittle portion which has reduced strength in comparison with respective strengths of other portions and which is provided between the intersection portion and the one end.

According to a second example embodiment of the present disclosure, there is provided a steering device that includes:

a pinion shaft which is a bar-shape member provided so as to be rotatable, and which has a pinion formed partially;

a rack shaft which has a rack formed so as to be meshed with the pinion, and which is movable in a vehicle widthwise direction; and a housing which stores therein at least the pinion and the rack, and which has a plurality of reinforcement ribs formed on an outer circumferential surface, in which the housing includes a pinion shaft storing portion which extends along the pinion shaft, and which stores therein at least a part of the pinion shaft, in which the plurality of ribs includes a first rib formed along an axial direction of the pinion shaft storing portion, and a second rib intersecting with the first rib, and in which when a portion where the first rib and the second rib intersect with each other is defined as an intersection portion, and in two ends of the first rib, an end close to the intersection portion is defined as the one end, the first rib comprises a brittle portion which is provided between the intersection portion and the one end and on the pinion shaft storing portion, and which is formed in a substantially V-shape so as to reduce strength in comparison with respective strengths of other portions.

Advantageous Effects of Invention

According to the present disclosure, a steering device is provided which can surely break a housing when predetermined load is input.

DESCRIPTION OF EMBODIMENTS

Embodiments of the present disclosure will be described below with reference to the accompanying figures. Note that, in the following descriptions, the terms right and left means a right side and a left side with reference to a driver, and front and back mean a front side and a back side with reference to the travelling direction of the vehicle. Moreover, in the figures, Le, Ri, Up, Dn mean a left side as viewed from the driver, a right side as viewed from the driver, an upper side, and a down side, respectively. Embodiments illustrated in the accompanying figures are merely examples of the present disclosure, and the present disclosure is not limited to such examples.

First Embodiment

Figure 1:
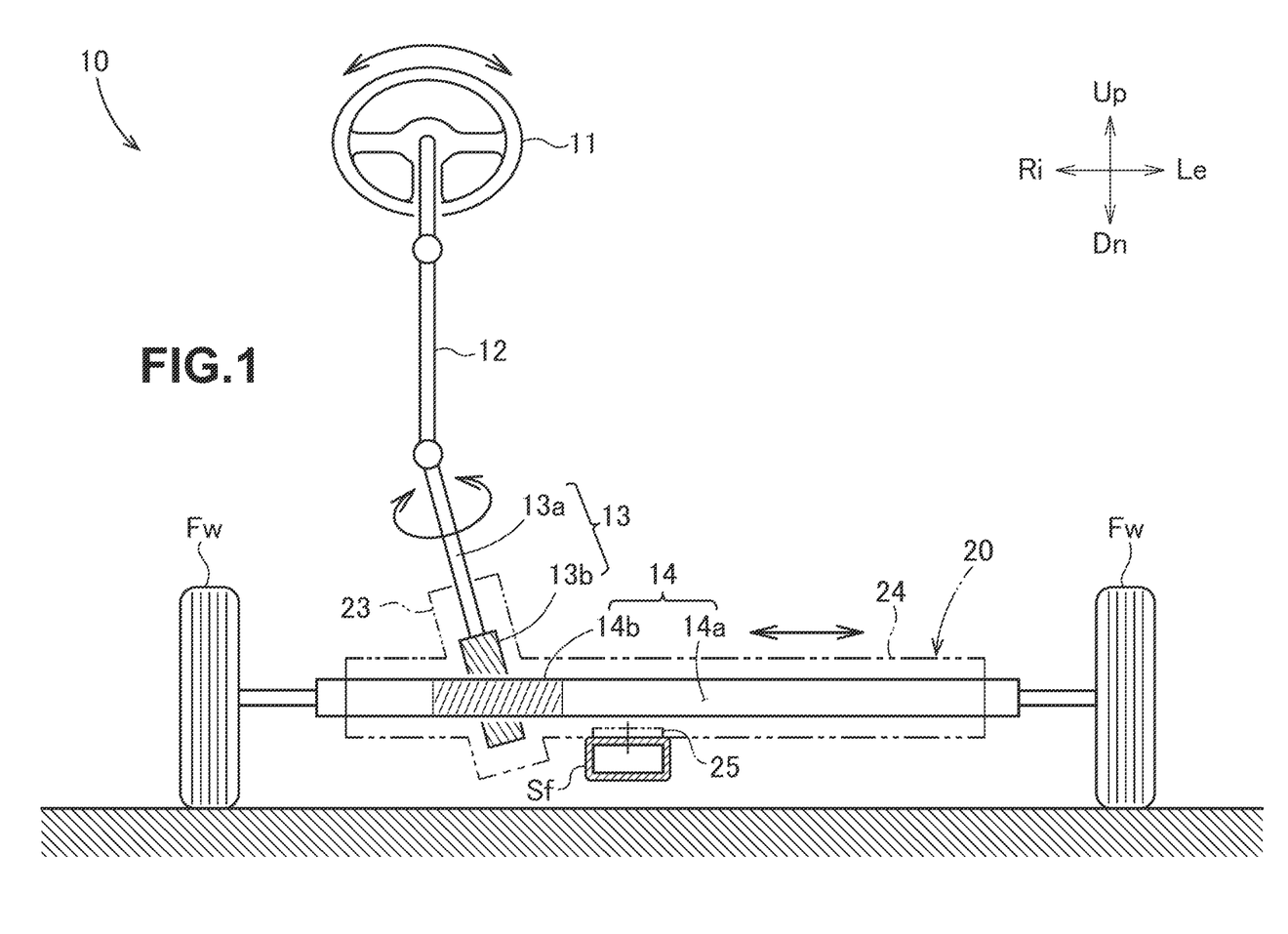
FIG. 1 is an exemplary diagram of a steering device according to a first embodiment of the present disclosure.

With reference to FIG. 1, a steering device 10 turns front wheels Fw and Fw in an arbitrary direction when a driver turns a steering wheel 11 so as to control a direction in which the vehicle runs.

The steering device 10 includes the steering wheel 11 which is provided so as to be turnable and which is operated by the driver, an intermediate shaft 12 which is connected to the steering wheel 11, and which is rotated when the steering wheel 11 is turned, a pinion shaft 13 which is connected to the intermediate shaft 12, and which is rotated when the intermediate shaft 12 is rotated, a rack shaft 14 which includes a rack 14b that is meshed with a pinion 13b formed at the tip of the pinion shaft 13, and which is displaced in the horizontal direction (the vehicle widthwise direction) when the pinion shaft 13 is rotated, and a housing 20 that stores therein a part of the pinion shaft 13 and a part of the rack shaft 14.

Note that the steering device 10 may be provided with a motor, etc., that adds assist force to the operation of the steering wheel 11. That is, the present disclosure is also applicable to a power steering device.

Moreover, the applied power steering device may be hydraulic type or electric type. Furthermore, as for a scheme to add assist force, any schemes, such as a dual pinion assist type, a belt rack assist type, a pinion assist type, and a rack assist type, can be selected as appropriate.

The pinion shaft 13 includes a pinion shaft portion 13a that is a bar-shape member, and the pinion 13b formed at the tip of the pinion shaft portion 13a.

The rack shaft 14 includes a rack shaft portion 14a that is a bar-shape member, and the rack 14b formed at the portion of the rack shaft portion 14a corresponding to the pinion 13b.

For example, the housing 20 is fastened to a sub-frame Sf. The sub-frame Sf forms a part of the vehicular body, and also supports an engine, a transmission, etc. The sub-frame Sf will be also referred to as a vehicular body Sf below.

Figure 2:
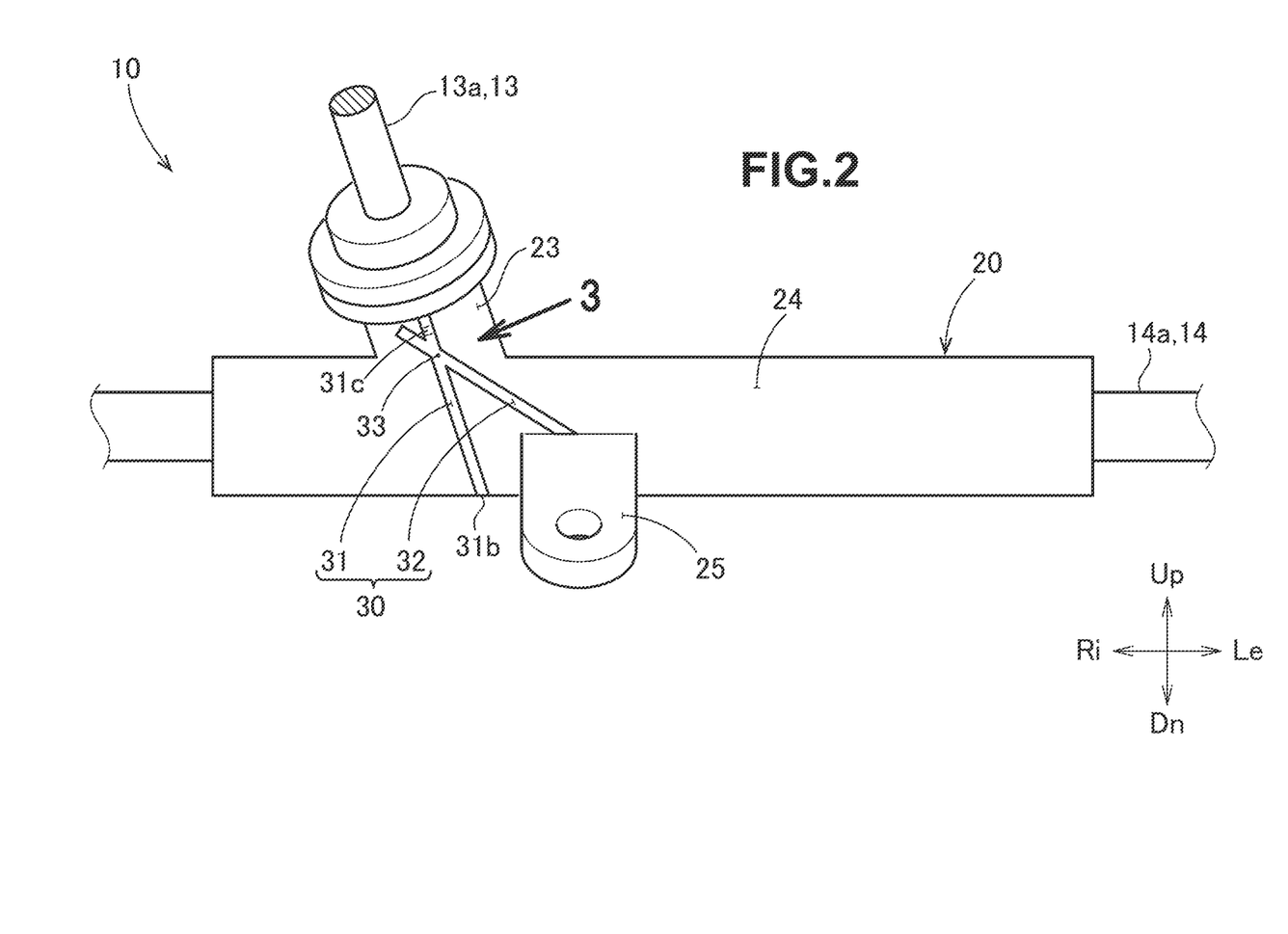
FIG. 2 is a front view of a housing illustrated in FIG. 1.

With reference to also FIG. 2, the housing 20 includes a pinion shaft storing portion 23 which extends along the pinion shaft 13, and which stores a part of the pinion shaft 13, a rack shaft storing portion 24 which extends along the rack shaft 14, and which stores a part of the rack shaft 14, and a vehicular body attachment portion 25 which extends towards the vehicular body Sf, and which is fastened to the vehicular body Sf.

The whole pinion 13b and a part of the pinion shaft portion 13a are stored in the pinion shaft storing portion 23. A rib 30 to reinforce the housing is formed on the outer circumferential surface of the pinion shaft storing portion 23.

The whole rack 14b and a part of the rack shaft portion 14a are stored in the rack shaft storing portion 24.

The rib 30 includes a first rib 31 formed along the axial direction of the pinion shaft storing portion 23 (the axial direction of the pinion shaft 13), and a second rib 32 that has a tip intersecting with the first rib 31.

Figure 3:
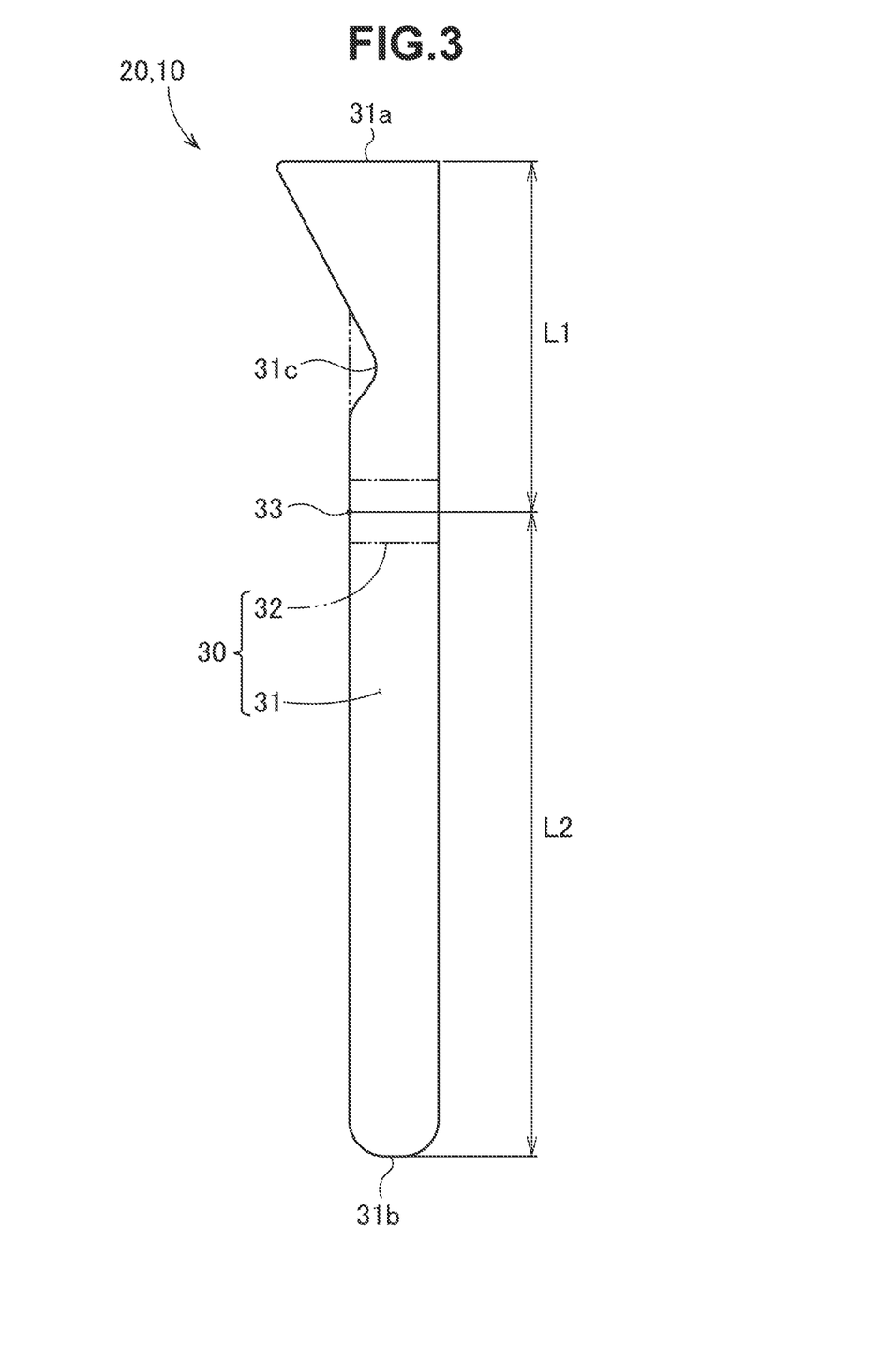
FIG. 3 is a diagram of a part illustrated in FIG. 2 along an arrow 3.

With reference to FIG. 2 and FIG. 3, a portion where the first rib 31 and the second rib 32 intersect with each other will be referred to as an intersection portion 33. Moreover, in the two ends of the first rib 31, the end close to the intersection portion 33 will be referred to as one end 31a, and the end distant from the intersection portion 33 will be referred to as the other end 31b. That is, when it is defined that a length from the one end 31a to the intersection portion 33 is L1, and a length from the other end 31b to the intersection portion 33 L2, L1<L2 is satisfied.

Note that, when the intersection portion 33 is formed at the center of the first rib 31, an arbitrary end can be taken as the one end 31a.

With reference to FIG. 3, the first rib 31 is formed in a tapered shape so as to gradually decrease the height from the one end 31a toward the intersection portion. Moreover, a brittle portion 31c in a substantially V-shape and in a notch-like shape is formed continuously from the bottom end portion of the portion formed in the tapered shape. In other words, the rib height continuously increases from the end of the brittle portion 31c to the one end 31a. The first rib 31 is formed to have substantially the uniform height from the intersection portion 33 to the other end 31b.

The brittle portion 31c is a portion that has a lower strength than those of the other portions. The brittle portion 31c is formed between the one end 31a and the intersection portion 33. Since the first rib 31 is formed at the pinion shaft storing portion 23 (see FIG. 2), the brittle portion 31c is also located at the pinion shaft storing portion 23. The brittle portion 31c is formed at a portion that is close to the intersection portion 33 relative to the one end 31a.

With reference to FIG. 2, the second rib 32 has one end intersecting with the first rib 31, and has the other end extending to the end of the vehicular body attachment portion 25. A part of the second rib 32 is located at the rack shaft storing portion 24.

Next, an action of the steering device 10 will be described.

Figure 4:
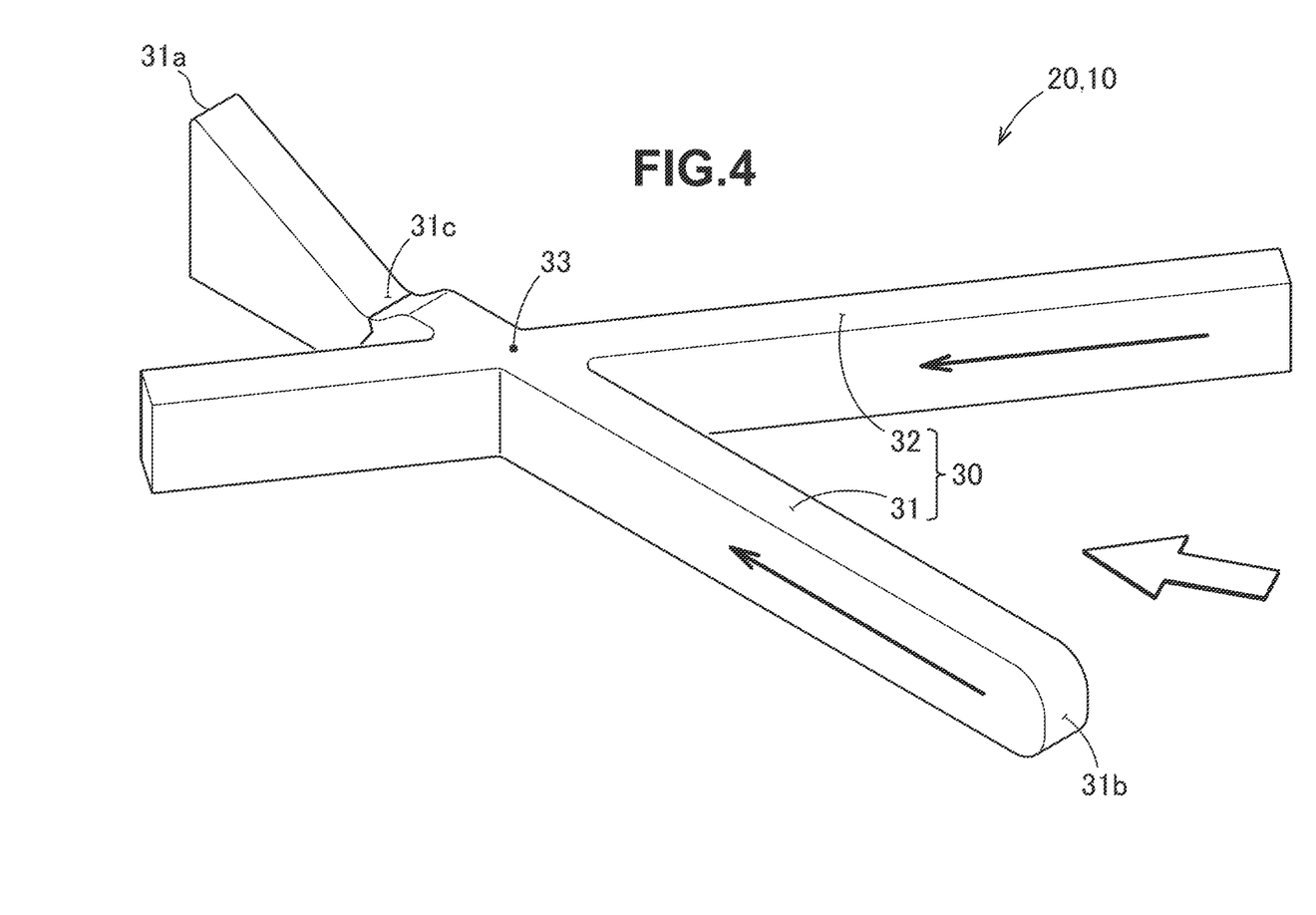
FIG. 4 is a diagram for describing an action of the steering device illustrated in FIG. 2.

With reference to FIG. 4, a vehicle may collide with, while running, the other vehicle or an installed object installed on a road. Due to the occurrence of collision, as indicated by a whitened arrow, loads may be applied to the housing 20. Some of the loads applied to the housing 20 are transmitted to the first rib 31 and to the second rib 32. The loads transmitted to the first rib 31 and to the second rib 32 reach the brittle portion 31c through the intersection portion 33 as indicated by black arrows. When load that is equal to or greater than a predetermined degree is applied, the housing 20 breaks from the brittle portion 31c since the brittle portion 31c has a lower strength than those of the other portions.

Next, the steering device 10 will be summarized.

With reference to FIG. 1 and FIG. 3, the steering device 10 includes the pinion shaft 13 which is a bar-shape member provided so as to be rotatable, and which has the pinion 13b formed partially, the rack shaft 14 which has the rack 14b formed so as to be meshed with the pinion 13b, and which is movable in the vehicle widthwise direction, and the housing 20 that stores therein at least the pinion 13b and the rack 14b. At least two reinforcement ribs that are the first rib 31 and the second rib 32 intersecting with the first rib 31 are formed on the outer circumferential surface of the housing 20. When a portion where the first rib 31 and the second rib 32 intersect with each other is defined as the intersection portion 33, and in the two ends of the first rib 31, the end close to the intersection portion 33 is defined as the one end 31a, the first rib 31 includes the brittle portion 31c which has reduced strength in comparison with those of the other portions and which is provided between the intersection portion 33 and the one end 31a.

With reference to FIG. 4, the steering device 10 includes the first rib 31 formed on the outer circumferential surface of the housing 20, the second rib 32 that intersects with the first rib 31, and the brittle portion 31c which has reduced strength in comparison with those of the other portions, and which is formed between the one end 31a which is the end close to the intersection portion 33 in the two ends of the first rib 31 and the intersection portion 33. When external collision load is applied, since the intersection portion 33 is formed, stress is concentrated to the intersection portion 33. Moreover, by forming the brittle portion 31x near the intersection portion 33 where the stress is concentrated, when input load exceeds a predetermined degree, the housing 20 can break from the brittle portion 31c. Hence, the steering device 10 can be provided which can further surely break the housing 20 when predetermined load.

With reference to FIG. 2, the brittle portion 31c is located at the pinion shaft storing portion 23. The housing 20 can thus break from the pinion shaft storing portion 23. The pinion shaft 13 can be spaced apart from the rack shaft 14 by breaking from the pinion shaft storing portion 23. This prevents the steering wheel 11 (see FIG. 1) from turning against the intent of the driver at the time of collision, etc.

Moreover, when the housing 20 is coupled to the sub-frame Sf, at the time of collision, etc., the sub-frame can be caused to further surely fall off. This prevents the engine and the transmission, etc., supported by the sub-frame Sf from entering in the vehicle. Hence, the protection performance for the driver can be enhanced.

The first rib 31 is formed along the axial direction of the pinion shaft storing portion 23. Hence, the pinion shaft storing portion 23 can break across the circumferential direction. The pinion shaft 13 can be surely spaced apart from the rack shaft 14.

Note that, the brittle portion 31c can formed in an arbitrary selected shape. Modified examples that have differences in the shape of the brittle portion 31c will be described.

Figure 5A:
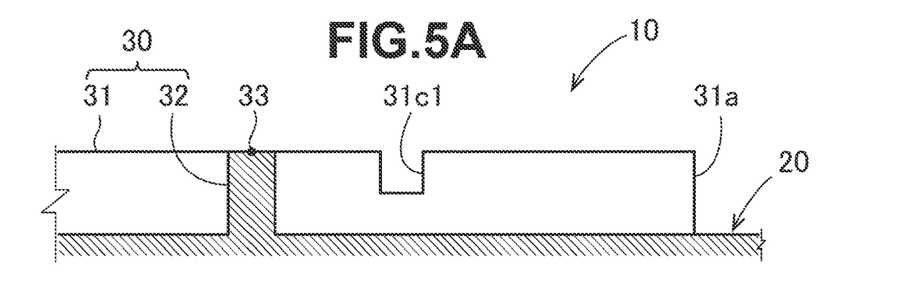
FIG. 5A is a diagram for describing a brittle portion formed in a step shape in the upper surface of a first rib according to a first modified example.

With reference to FIG. 5A, a brittle portion 31c1 may be formed in a substantially U-shaped step shape that is opened upwardly in such a way that the rib height of the first rib 31 decreases.

Figure 5B:
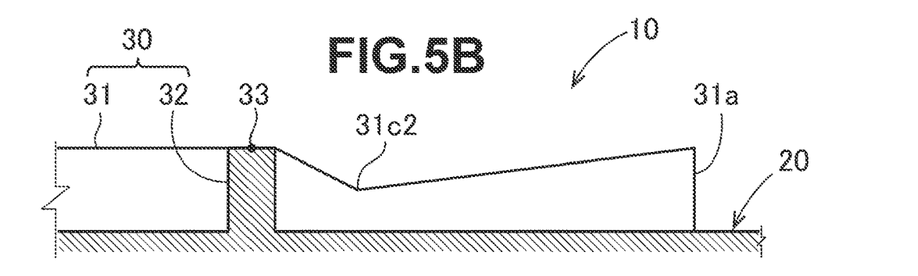
FIG. 5B is a diagram for describing a brittle portion formed in a substantially V-shape in the upper surface of the first rib according to a second modified example.

With reference to FIG. 5B, the upper surface of the first rib 31 may be formed in a substantially V-shape in such a way that a brittle portion 31c2 becomes a bottom, is formed as a declined slope from the intersection portion 33 to the brittle portion 31c2, and is formed as a declined slope from the one end 31a to the brittle portion 31c2.

Figure 5C:
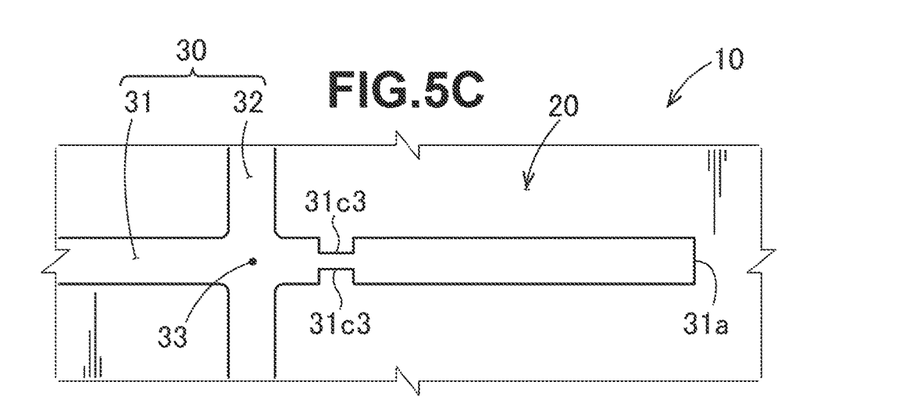
FIG. 5C is a diagram for describing a brittle portion formed in a step shape in the side surface of the first rib according to a third modified example.

With reference to FIG. 5C, both side surfaces of the first rib 31 are formed in a substantially U-shaped step shape in such a way that the width thereof becomes the narrowest at brittle portions 31c3. Note that it is appropriate that at least one side surface in the two side surfaces may be formed in a step shape.

Figure 5D:
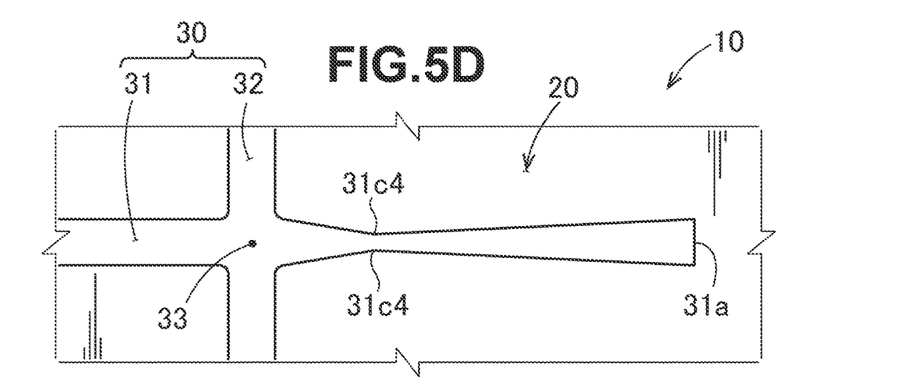
FIG. 5D is a diagram for describing a brittle portion formed in a substantially V-shape in the side surface of the first rib according to a fourth modified example.

With reference to FIG. 5D, the side surfaces of the first rib 31 are formed in a substantially V-shape in such a way that the brittle portions 31c4 become the respective bottoms, the width continuously narrows down from the intersection portion 33 to the brittle portion 31c4, and the width continuously narrows down from the one end 31a to the brittle portion 31c4. Note that it is appropriate that at least either one side surface in the two side surfaces may be formed in a substantially V-shape.

Second Embodiment

Next, a second embodiment will be described with reference to the figure. A steering device 10A according to the second embodiment employs the basic structure that is similar to that of the steering device 10 (see. FIG. 1) according to the first embodiment. Hence, the same reference numeral will be given to the common structure, and the detailed description thereof will be omitted as appropriate.

Figure 6:
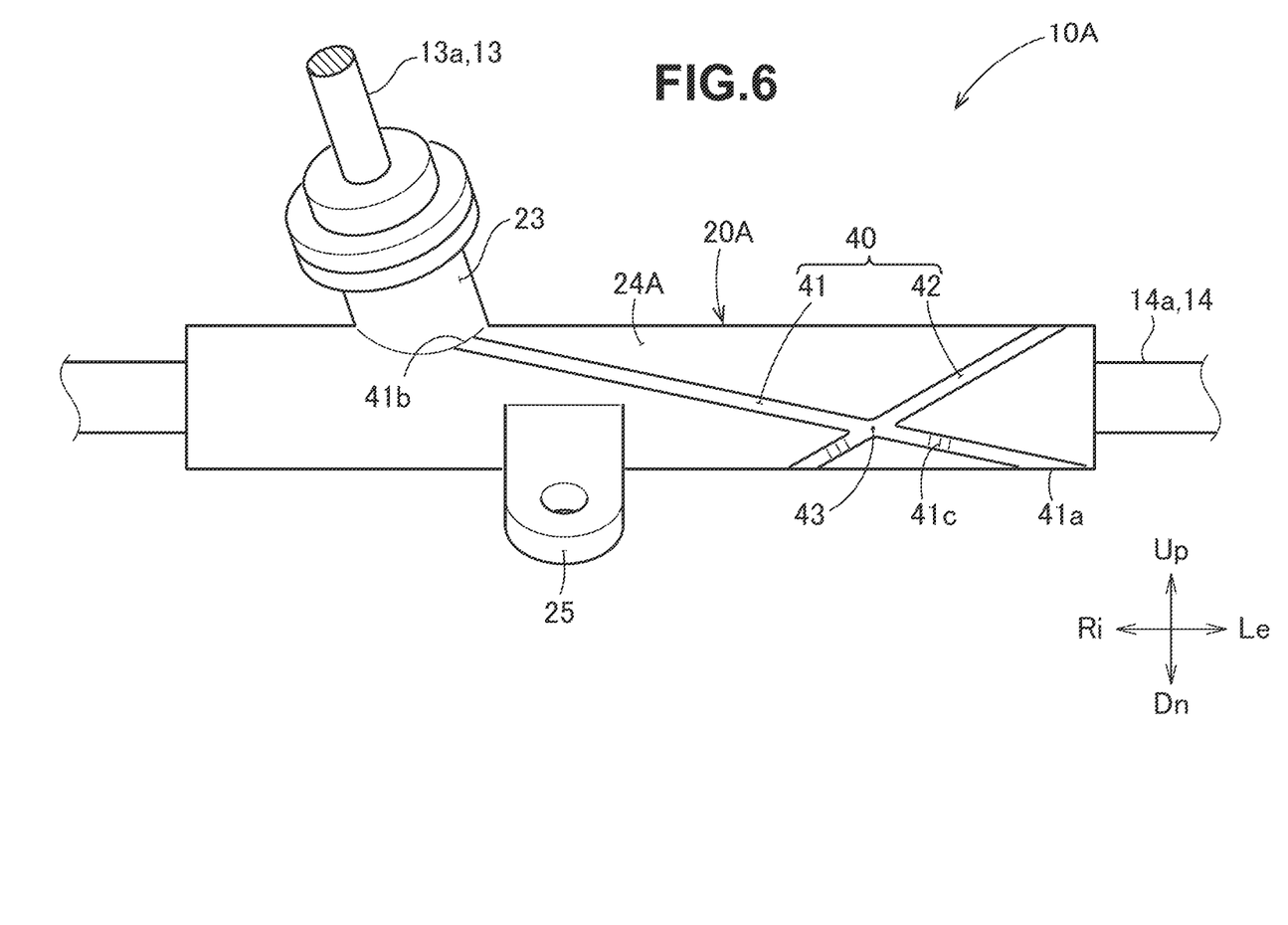
FIG. 6 is a diagram for describing a steering device according to a second embodiment of the present disclosure.

With reference to FIG. 6, according to the steering device 10A of the second embodiment, a rib 40 is formed at a rack shaft storing portion 24A of a housing 20A.

The rib 40 includes a first rib 41, and a second rib 42 that intersects with the first rib 41. The first rib 41 and the second rib 42 intersect with each other at an intersection portion 43. In the two ends of the first rib 41, the end close to the intersection portion 43 is defined as the one end 41a, and the end distant from the intersection portion 43 is defined as the other end 41b.

A brittle portion 41c that has a lower strength than those of the other portions is formed between the one end 41a of the first rib 41 and the intersection portion 43.

The above-described steering device 10A can also accomplish the predetermined advantageous effects of the present disclosure.

Moreover, the brittle portion 41c is located at a rack shaft storing portion 24A. Hence, a housing 20A can break from the rack shaft storing portion 24A. In general, the rack shaft storing portion 24A is larger than the pinion shaft storing portion 23 and the vehicular body attachment portion 25. Hence, breaking such a portion enables absorption of further collision energy.

Third Embodiment

Next, a third embodiment will be described with reference to the figure. A steering device 10B according to the third embodiment also employs the basic structure which is similar to that of the steering device 10 (see FIG. 1) according to the first embodiment. Hence, the same reference numeral will be given to the common component, and the detailed description thereof will be omitted as appropriate.

Figure 7:
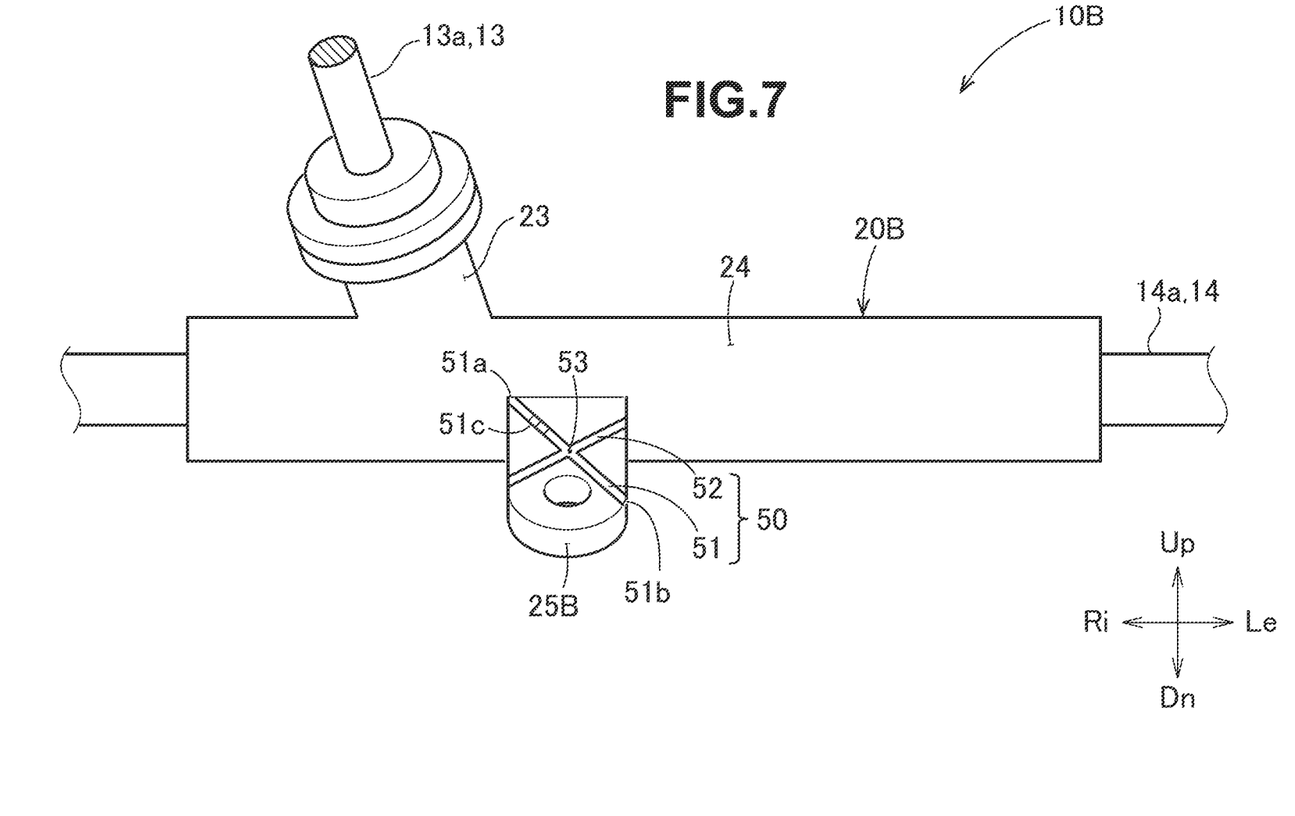
FIG. 7 is a diagram for describing a steering device according to a third embodiment of the present disclosure.

With reference to FIG. 7, according to the steering device 10B of the third embodiment, a rib 50 is formed at a vehicular body attachment portion 25B of a housing 20B.

The rib 50 includes a first rib 51, and a second rib 52 that intersects with the first rib 51. The first rib 51 and the second rib 52 intersect with each other at an intersection portion 53. In the two ends of the first rib 51, the end close to the intersection portion 53 is defined as the one end 51a, and the end distant from the from the intersection portion 53 is defined as the other end 51b.

A brittle portion 51c that has a lower strength than those of the other portions is formed between the one end 51a of the first rib 51 and the intersection portion 53.

The above-described steering device 10B can also accomplish the predetermined advantageous effects of the present disclosure.

Moreover, the brittle portion 51c is located at a vehicular body attachment portion 25B. Hence, when predetermined load is input to the steering device 10B, a housing 20B can break from the vehicular body attachment portion 25B. Breaking a connection portion to the vehicular body Sf (see FIG. 1) enables the steering device 10B to be surely separated from the vehicular body Sf.

Note that each embodiment and modified example can be combined as appropriate. The shape of the brittle portion described in the modified example can be applied to the respective brittle portion of the steering devices 10A and 10B. Moreover, the present disclosure is not limited to the embodiments as far as the actions and advantageous effects of the disclosure can be accomplished.

INDUSTRIAL APPLICABILITY

The steering device of the present disclosure is suitable for a passenger vehicle.

REFERENCE SIGNS LIST

10, 10A, 10B Steering device
13 Pinion shaft
13b Pinion
14 Rack shaft
14b Rack
20, 20A, 20B Housing
23 Pinion shaft storing portion
24A Rack shaft storing portion
25B Vehicular body attachment portion
30, 40, 50 Rib
31, 41, 51 First rib
31a, 41a, 51a One end
31c, 31c1 to 31c4, 41c, 51c Brittle portion
32, 42, 52 Second rib
33, 43, 53 Intersection portion
Sf Sub-frame (vehicular body)

The invention claimed is:

1. A steering device comprising:
a pinion shaft which is a bar-shape member provided so as to be rotatable, and which has a pinion formed partially;
a rack shaft which has a rack formed so as to be meshed with the pinion, and which is movable in a vehicle widthwise direction; and
a housing that stores therein at least the pinion and the rack,
wherein at least two reinforcement ribs that are a first rib and a second rib intersecting with the first rib are formed on an outer circumferential surface of the housing, and
wherein when a portion where the first rib and the second rib intersect with each other is defined as an intersection portion, the first rib having two ends, the end closest to the intersection portion is defined as the one end, the first rib comprises a brittle portion which has reduced strength in comparison with respective strengths of other portions of the first rib and which is provided between the intersection portion and the one end.

2. The steering device according to claim 1, wherein:
the housing comprises a pinion shaft storing portion which extends along the pinion shaft, and which stores therein at least a part of the pinion shaft; and
the brittle portion is located at the pinion shaft storing portion.

3. The steering device according to claim 2, wherein the first rib is formed along an axial direction of the pinion shaft storing portion.

4. The steering device according to claim 1, wherein:
the housing comprises a rack shaft storing portion which extends along the rack shaft, and which stores therein at least a part of the rack shaft; and
the brittle portion is located at the rack shaft storing portion.

5. The steering device according to claim 1, wherein:
the housing comprises a vehicular body attachment portion which extends along a vehicular body, and which is fastened to the vehicular body; and
the brittle portion is located at the vehicular body attachment portion.

6. The steering device according to claim 1, wherein the brittle portion is formed in a step shape in such a way that a rib height of the first rib decreases.

7. The steering device according to claim 1, wherein an upper surface of the first rib is formed in a substantially V-shape in such a way that the brittle portion becomes a bottom, is formed as a declined slope from the intersection portion to the brittle portion, and is formed as a declined slope from the one end to the brittle portion.

8. The steering device according to claim 1, wherein side surfaces of the first rib are formed in a step shape in such a way that a width of the first rib becomes narrowest at the brittle portion.

9. The steering device according to claim 1, wherein:
at least one side surface of the first rib is formed in a substantially V-shape in such a way that the brittle portion becomes a bottom;
a width of the first rib continuously narrows down from the intersection portion to the brittle portion; and
the width continuously narrows down from the one end to the brittle portion.

10. The steering device according to claim 2, wherein the brittle portion is formed in a step shape in such a way that a rib height of the first rib decreases.

11. The steering device according to claim 2, wherein an upper surface of the first rib is formed in a substantially V-shape in such a way that the brittle portion becomes a bottom, is formed as a declined slope from the intersection portion to the brittle portion, and is formed as a declined slope from the one end to the brittle portion.

12. The steering device according to claim 2, wherein side surfaces of the first rib are formed in a step shape in such a way that a width of the first rib becomes narrowest at the brittle portion.

13. The steering device according to claim 2, wherein:
- at least one side surface in side surfaces of the first rib is formed in a substantially V-shape in such a way that the brittle portion becomes a bottom;
- a width of the first rib continuously narrows down from the intersection portion to the brittle portion; and
- the width continuously narrows down from the one end to the brittle portion.

14. The steering device according to claim 3, wherein the brittle portion is formed in a step shape in such a way that a rib height of the first rib decreases.

15. The steering device according to claim 3, wherein an upper surface of the first rib is formed in a substantially V-shape in such a way that the brittle portion becomes a bottom, is formed as a declined slope from the intersection portion to the brittle portion, and is formed as a declined slope from the one end to the brittle portion.

16. The steering device according to claim 3, wherein side surfaces of the first rib are formed in a step shape in such a way that a width of the first rib becomes narrowest at the brittle portion.

17. The steering device according to claim 3, wherein:
- at least one side surface in side surfaces of the first rib is formed in a substantially V-shape in such a way that the brittle portion becomes a bottom;
- a width of the first rib continuously narrows down from the intersection portion to the brittle portion; and
- the width continuously narrows down from the one end to the brittle portion.

18. The steering device according to claim 4, wherein the brittle portion is formed in a step shape in such a way that a rib height of the first rib decreases.

19. The steering device according to claim 4, wherein an upper surface of the first rib is formed in a substantially V-shape in such a way that the brittle portion becomes a bottom, is formed as a declined slope from the intersection portion to the brittle portion, and is formed as a declined slope from the one end to the brittle portion.

20. The steering device according to claim 4, wherein side surfaces of the first rib are formed in a step shape in such a way that a width of the first rib becomes narrowest at the brittle portion.

\* \* \* \* \*